United States Patent
Gubbi

(10) Patent No.: US 9,119,076 B1
(45) Date of Patent: Aug. 25, 2015

(54) SYSTEM AND METHOD FOR AUTHENTICATION USING A MOBILE COMMUNICATION DEVICE

(75) Inventor: Rajath Gubbi, Bangalore (IN)

(73) Assignee: EMC CORPORATION, Hopkinton, MA (US)

( * ) Notice: Subject to any disclaimer, the term of this patent is extended or adjusted under 35 U.S.C. 154(b) by 610 days.

(21) Appl. No.: 12/636,612

(22) Filed: Dec. 11, 2009

(51) Int. Cl.
   H04M 1/66    (2006.01)
   H04M 1/68    (2006.01)
   H04M 3/16    (2006.01)
   H04W 12/12   (2009.01)

(52) U.S. Cl.
   CPC .......... *H04W 12/12* (2013.01); *H04M 2215/32* (2013.01)

(58) Field of Classification Search
   CPC . H04M 2215/32; H04W 12/12; H04W 12/06; H04W 8/245; H04W 60/00; H04W 4/14; H04W 80/04; H04W 12/02; H04B 1/3816; H04L 2012/5607; H04L 63/08; H04L 63/146; H04L 9/08; H04L 9/3281; G06F 21/31
   USPC .............. 455/409, 410, 411, 418, 435.1, 466, 455/558; 370/310.2, 328; 726/5, 6, 9, 23; 713/150, 168, 170, 172, 201; 380/270
   See application file for complete search history.

(56) References Cited

U.S. PATENT DOCUMENTS

| | | | |
|---|---|---|---|
| 6,161,185 A * | 12/2000 | Guthrie et al. | 726/5 |
| 6,711,687 B1 * | 3/2004 | Sekiguchi | 726/23 |
| 6,988,657 B1 | 1/2006 | Singer et al. | |
| 7,114,178 B2 | 9/2006 | Dent et al. | |

(Continued)

FOREIGN PATENT DOCUMENTS

| | | |
|---|---|---|
| EP | 1320236 A1 | 6/2003 |
| EP | 1102157 B1 | 9/2008 |

(Continued)

OTHER PUBLICATIONS

EMC Press Release, Swiss Environmental Company Taps RSA to Ensure Business Continuity in the Event of Global H1N1 Pandemic, Nov. 11, 2009, Bedford, MA.

(Continued)

*Primary Examiner* — Steve D Agosta
(74) *Attorney, Agent, or Firm* — Dergosits & Noah LLP; Todd A. Noah

(57) ABSTRACT

The invention is a system and method for registering and authenticating a user using a mobile communication device, such as a mobile phone. An authentication server has access to a stored list of authorized mobile phone numbers. Each authorized mobile phone number is associated with a string of text or numeric characters. The server provides a OTP when the user calls or sends a SMS message request from the authorized mobile phone to the server. The verbal or SMS request must contain the stored string, which the server will match against the stored list in order to confirm that the mobile phone is authorized. Once a OTP is provided to the authorized mobile phone, it must be used within a predetermined time limit, or the OTP will expire. The OTP will also be discarded once the server is notified that the OTP has been used. Further, the server will ignore a request for an additional OTP if a previously-provided OTP has not expired or been discarded, or if the server is in the process of generating an OTP for the authorized mobile phone.

19 Claims, 6 Drawing Sheets

(56) References Cited

U.S. PATENT DOCUMENTS

| | | | |
|---|---|---|---|
| 7,240,036 | B1 | 7/2007 | Mamdani et al. |
| 7,337,229 | B2 | 2/2008 | Dutta et al. |
| 7,349,685 | B2 | 3/2008 | Tseitlin et al. |
| 7,379,921 | B1 | 5/2008 | Kiliccote |
| 7,392,388 | B2 | 6/2008 | Keech |
| 7,457,418 | B2 | 11/2008 | Bunte et al. |
| 2002/0029197 | A1 | 3/2002 | Kailamaki et al. |
| 2002/0194499 | A1 | 12/2002 | Audebert et al. |
| 2003/0051041 | A1 | 3/2003 | Kalavade et al. |
| 2003/0182242 | A1 | 9/2003 | Scott et al. |
| 2003/0204725 | A1* | 10/2003 | Itoi et al. ............... 713/168 |
| 2004/0107170 | A1 | 6/2004 | Labrou et al. |
| 2004/0177272 | A1* | 9/2004 | Walters ............... 713/201 |
| 2005/0233729 | A1 | 10/2005 | Stojanovski et al. |
| 2005/0283444 | A1 | 12/2005 | Ekberg |
| 2006/0002556 | A1 | 1/2006 | Paul |
| 2006/0016880 | A1 | 1/2006 | Singer et al. |
| 2007/0271598 | A1* | 11/2007 | Chen et al. ............... 726/4 |
| 2008/0046734 | A1 | 2/2008 | Kilian-Kehr |
| 2008/0127320 | A1 | 5/2008 | De Lutiis et al. |
| 2008/0148040 | A1 | 6/2008 | Machani et al. |
| 2008/0268882 | A1 | 10/2008 | Moloney |

FOREIGN PATENT DOCUMENTS

| | | |
|---|---|---|
| EP | 1965596 A1 | 9/2008 |
| GB | 2419016 A | 12/2006 |
| GB | 2437761 A | 11/2007 |
| WO | WO0008879 | 2/2000 |
| WO | WO2007071009 A1 | 6/2007 |
| WO | WO2007136277 | 11/2007 |

OTHER PUBLICATIONS

EMC Collateral, RSA SecurID® On-demand Authenticator, Aug. 26, 2008, Bedford, MA.

* cited by examiner

SYSTEM AND METHOD FOR AUTHENTICATION USING A MOBILE COMMUNICATION DEVICE

FIELD

The invention relates generally to authentication, and specifically, to authenticating the identity of a user using a mobile communication device, such as a mobile phone.

BACKGROUND

Effective authentication for enabling access to a secure network service typically considers a three-pronged approach: 1) something you know; 2) something you have; and 3) something you are. While most authentication methods rely on "something you know," i.e., a login ID and a password, incorporating an additional prong can result in more reliable and more secure authentication. Hardware tokens, such as the RSA SecurID® token, provide an easy way to implement the "something you have" authentication prong. A token will generate a time-sensitive authentication code that must be used within a certain amount of time, or the token will discard the code and will generate another code. It is presumed that the authorized user of a hardware token will safeguard the token. However, it is not always cost-effective or secure to provide hardware tokens to each and every user of a secure network service. Hardware tokens can be lost or stolen, and individual tokens are difficult to track.

What is therefore needed is a way to implement an authentication method that does not require the distribution of hardware tokens. What is needed is an authentication method that can utilize a device that may already be in the user's possession.

BRIEF DESCRIPTION OF THE FIGURES

The invention is illustrated by way of example and not limitation in the figures of the accompanying drawings, in which like references indicate similar elements, and in which.

DETAILED DESCRIPTION

Figure 1:
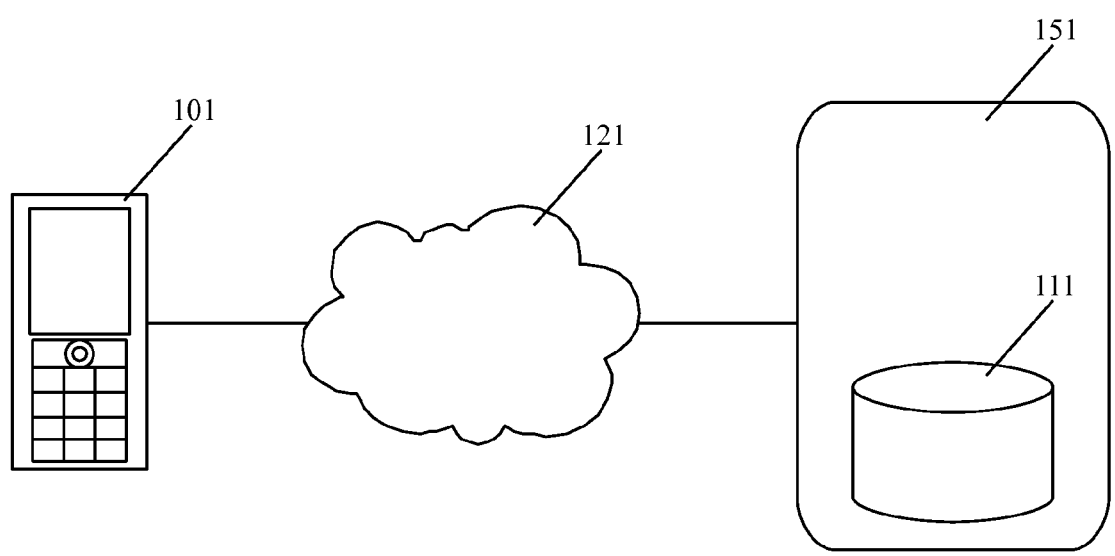
FIG. 1 is an exemplary block diagram depicting an embodiment of the invention.

The invention is a system and method for verifying the identity of a user using a mobile communication device, such as a mobile phone. Unlike current authentication methods, the invention may authenticate a user and provide a one-time password ("OTP") using a mobile phone without any Internet access. Mobile phones may be used in lieu of hardware tokens because they are easier to track, and most users may already have them in their possession. In addition, a user is more often going to protect his or her mobile phone rather than a hardware token. In order to conserve network resources, authentication by mobile phone may be performed using SMS messages, also known as text messages, or through email. The user may also be authenticated over a voice call from the mobile phone. Once a user is authenticated, the user will be provided with a OTP that he may use to log into a corporate email server or other secure network service.

It should be appreciated that the invention can be implemented in numerous ways, including as a method, a process, an apparatus, a system, a device, a method, a computer readable medium such as a computer readable storage medium containing computer readable instructions or computer program code, or as a computer program product comprising a computer usable medium having a computer readable program code embodied therein.

In the context of this document, a computer usable medium or computer readable medium may be any medium that can contain or store the program for use by or in connection with the instruction execution system, apparatus or device. For example, the computer readable storage medium or computer usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, infrared, optical, or electrical system, apparatus or device for storing information. Alternatively or additionally, the computer readable storage medium or computer usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory.

Applications, software programs or computer readable instructions may be referred to as components or modules. Applications may be hardwired or hard coded in hardware or take the form of software executing on a general purpose computer such that when the software is loaded into and/or executed by the computer, the computer becomes an apparatus for practicing the invention. Applications may also be downloaded in whole or in part through the use of a software development kit or toolkit that enables the creation and implementation of the invention. In this specification, these implementations, or any other form that the invention may take, may be referred to as techniques. In general, the order of the steps of disclosed processes may be altered within the scope of the invention.

FIG. 1 is a block diagram illustrating an embodiment of a system for authenticating the user of an authorized mobile communication device. In an embodiment, the system may include one or more mobile communication devices 101 connected on a cellular, wireless Internet or other network 121. One or more servers 151 may also have access to network 121, which may a public network or private network, such as a private corporate network. The one or more servers 151 may be one or more RSA servers or other servers used for performing authentication. The one or more servers 151 may receive one or more requests for authentication from the one or more mobile communication devices 101, and/or may transmit one or more OTPs to the one or more mobile communication devices 101. In addition, the one or more servers 151 may have access to a data storage 111 that stores a list of identifiers for authorized mobile communication devices. As used herein, a identifier may be a mobile phone number, but other identifiers are possible, such as an IP address, location information, or other unique identifier for the mobile communication device.

One will appreciate that data storage 111 may be a database, data table, file system or other memory store. Data storage 111 may be hosted on any of the one or more servers 151, or may exist externally from the one or more servers 151, so long as the one or more servers 151 have access to data storage 111. One will also appreciate that the configuration of the system illustrated in FIG. 1 is merely exemplary, and that other configurations are possible without departing from this disclosure or the scope of the invention. For example, servers 151 or data storage 111 may be singular or plural, or may be physical or virtualized.

Figure 2:
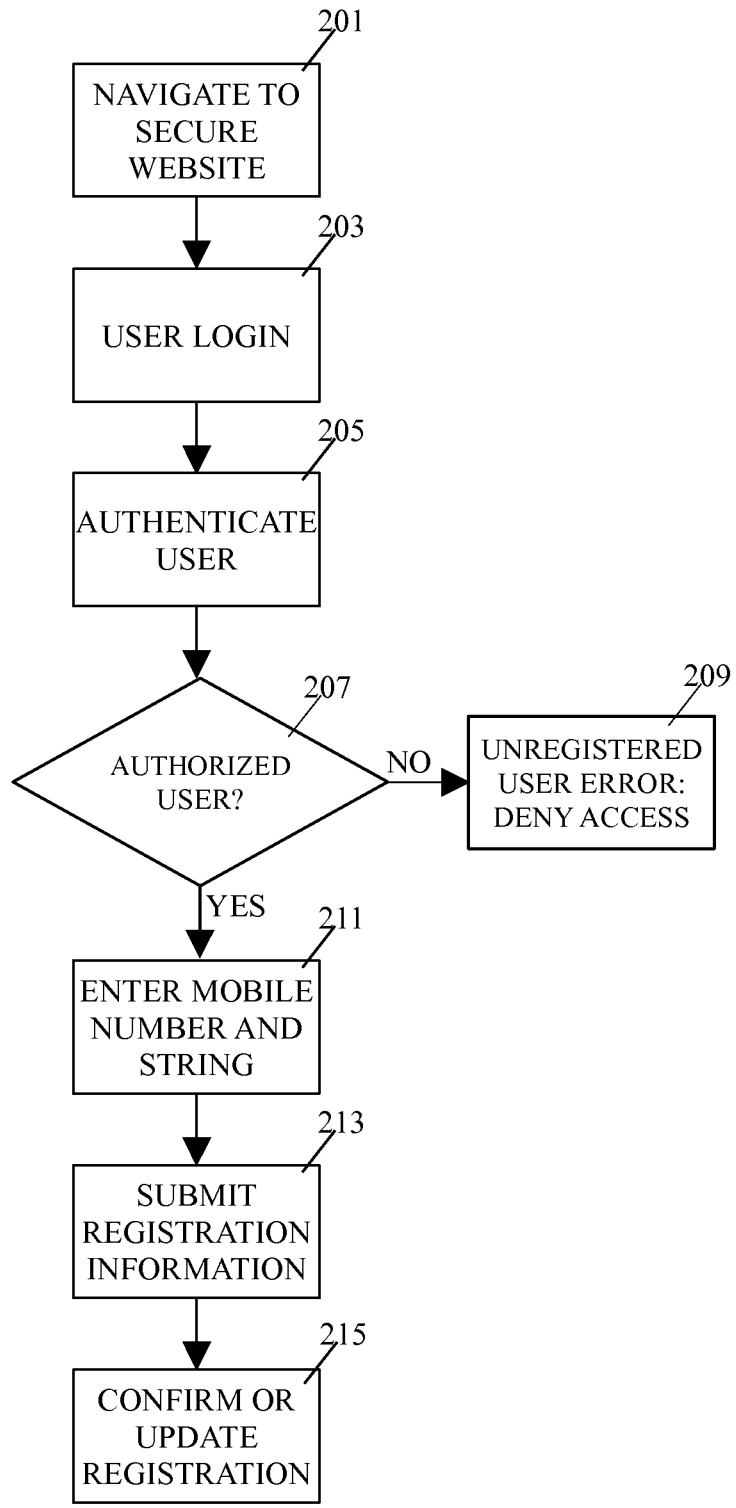
FIG. 2 is an exemplary flow diagram illustrating an online registration method, according to an embodiment of the invention.

One will appreciate that a mobile communication device user cannot become an authorized user unless the user registers with the authentication server 151. In an embodiment, a user may register his mobile communication device using a secure web site to which he already has secure access. For example, an employee desiring to register his mobile phone for authentication and receiving OTPs may log in to secure corporate website for his employer. FIG. 2 is a flow diagram depicting an embodiment in which a user registers online using a secure web service. In block 201, the user navigates to the website for a secure network service, which may be a private network, a corporate network, a website hosted or accessed by authentication server 151, or the like. Navigating to the secure website in block 201 may require entering a URL or selecting a hyperlink. One will appreciate that this method of authentication may require desktop or laptop access to the secure network, and a web browser for communicating with the secure network.

In block 203, the user will confirm that he has access to the website by logging in. The user may enter a user name or corporate ID number, as well as a password that has previously been registered with the secure network service. For example, the user may be required to enter the same information used to access the corporate email server or network storage. In block 205, the secure network service will authenticate the user by confirming the entered user name and password. The secure network service will confirm whether the user is authorized to register his mobile communication device with the secure network service in block 207. If the secure network service is unable to authenticate the user and confirm that he is authorized to register his mobile communication device, then in block 209, access will be denied and the administrator may be notified of the failed attempt. In an embodiment, the user may be given another opportunity to log in in case the user name or password was incorrectly entered. If the user is authorized for registration, then in block 211, the user may be directed to a web page for registering his mobile communication device, which may be a mobile phone. This web page may display a dialog box in which the user may enter his mobile communication device identifier, such as his mobile phone number. There may also be a dialog box for entering a security string. The web page may present a security question to the user, the answer to which will serve as the security string that the user will use later when requesting a OTP. In an embodiment, the user may enter any sequence of text, numbers or characters that is easily memorized by the user. In an embodiment, the user choose his own security question, and the answer to the security question that will serve as the security string. Other embodiments are possible so long as the user has an opportunity to provide a mobile communication device identifier and a security string for future OPT requests. In an embodiment, an authorized user may have the ability to register more than one mobile communication device.

After entering this information in block 211, the user submits this information to the secure network service in block 213. This information may then be saved in data storage 111 of FIG. 1. In this fashion, data storage 111 will be able to provide this information to server 151 when the user requests authentication using the registered mobile communication device. In block 215, the user may receive a notification, email or SMS confirming successful registration.

In an embodiment, the user may wish to notify the secure network service that his mobile communication device has changed. For example, the user may wish to change the mobile phone that was previously registered. One will appreciate that changing the mobile phone number may require repeating the method illustrated in FIG. 2 and described above. In an embodiment, after the user submits his information in block 213, the secure network service may check to see if the user has previously registered a mobile communication device, in which case the user may be asked if he wishes to update his registration information or add an additional mobile communication device. In an embodiment, the secure network service may check to see if the entered mobile communication device has already been registered with the service, in which case the user may be prevented from re-registering, or the user may be asked if he wishes to change the previously-registered security string. In an embodiment, after the registration method concludes or in the event the registered user updates any registered information, the user may be required to perform a successful OTP request and transmission in order to verify that the mobile communication device was successfully registered or update.

Figure 3:
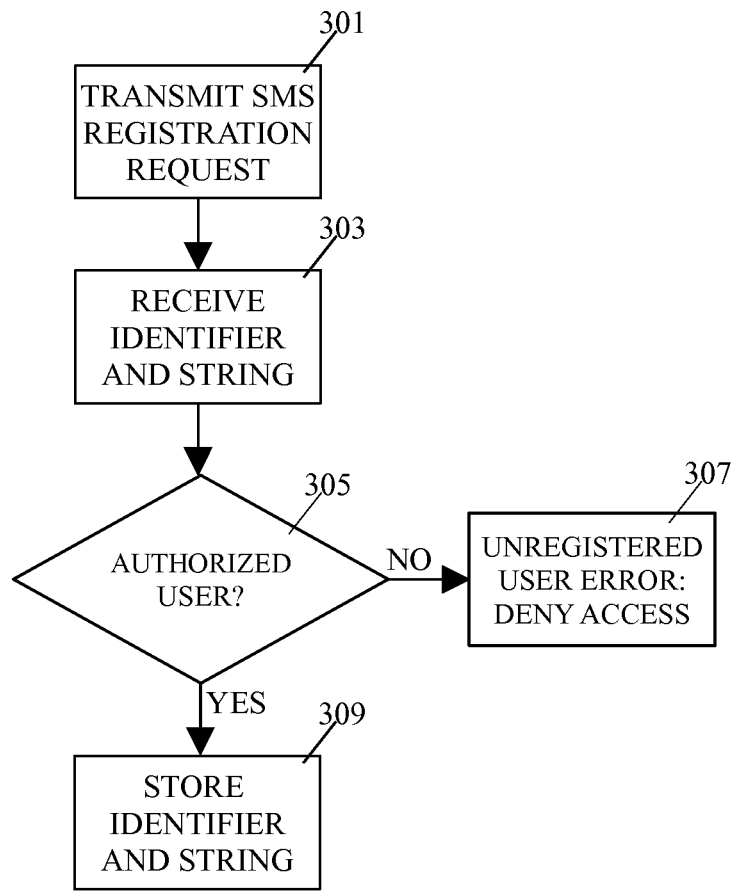
FIG. 3 is an exemplary flow diagram illustrating an SMS registration method, according to an embodiment of the invention.

In an embodiment, registration may be performed using SMS communication with a secure network service. FIG. 3 is a flow diagram depicting an embodiment of a method for registering a user using SMS messages to communicate with server 151 hosting the secure network service. In block 301, a user sends a SMS message from his mobile communication device 101 to a telephone number assigned to server 151. One will appreciate that server 151 may have a software application for receiving SMS messages and for registering users. The SMS message may include a command and an authentication code, or string. The command may be any instruction that notifies server 151 that a user is requesting enrollment. The security string may be any sequence of text, numbers or characters that is easily memorized by the user, such as the answer to a security question or a user-generated password. For example, the user may send a SMS message containing the terms "ENROLL REGCODE", in which case "ENROLL" is the command and "REGCODE" is the security string. In block 303 of FIG. 3, server 151 receives the enrollment request command and string, as well as the number or identifier of the mobile communication device 101 that sent the enrollment request. Using the identifier, in block 305, the secure network service may confirm whether mobile communication device 101 is authorized to register with the secure network service. If the secure network service is unable to authenticate the mobile communication device 101 and confirm that it is authorized, then in block 307, access will be denied and the administrator may be notified of the failed attempt. If the mobile communication device 101 is authorized to register with secure network service, then in block 309, the identifier and string are stored in data storage 111 so that server 151 may access data storage 111 in future transactions to authenticate the registered user. For example, if the mobile communication device 101 is a mobile phone, then the string will be associated with the mobile phone number and stored in data storage 111.

One will appreciate that other steps may be required in order to verify that the sender of the enrollment request is the actual user of the mobile communication device, or that the mobile communication device has permission to enroll with server 151 and/or the authentication service. For example, as described above and illustrated in block 203 of FIG. 2, the user may be required to enter in a corporate ID number, user name and password, other identifier or other credentials in order to confirm the user's identity and begin the registration process. In an embodiment, the user may provide a secondary email address for receiving notifications from server 151, such as if the user forgets his or her security string and requires re-registration or transmission of a temporary security string or the forgotten security string. In an embodiment, the secondary email address may be used to retrieve a generated OTP from server 151. In an embodiment, the method illustrated in FIGS. 2 and 3 may be performed verbally rather than using SMS messages, in which a user calls server 151 or an administrator in order to register the mobile communication device and string. FIGS. 2 and 3 are merely example registration methods and other processes may be implemented without departing from this disclosure or the scope of the invention, so long as server 151 can later access a data storage 111 in order to authenticate a mobile communication device user as discussed further below.

Figure 4:
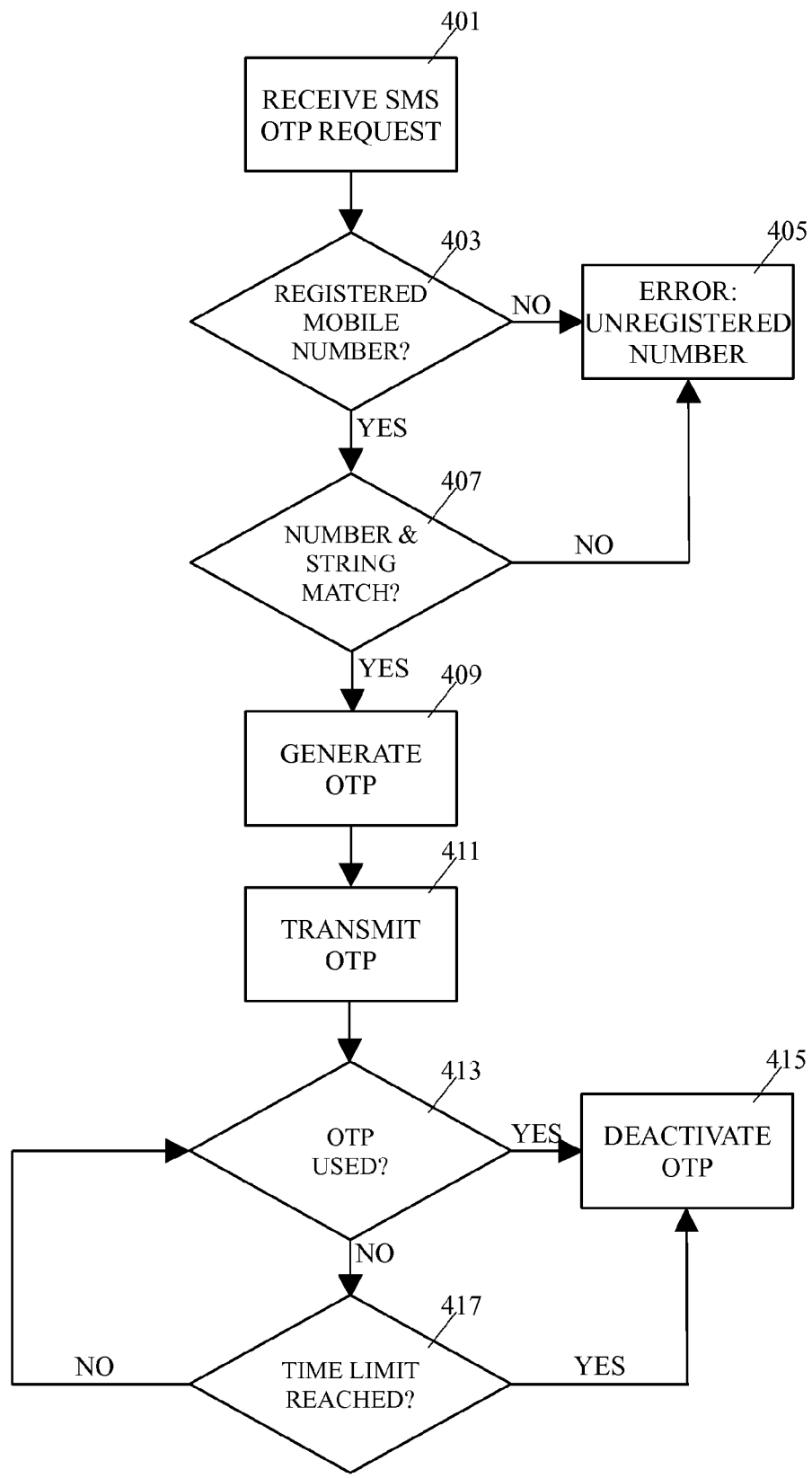
FIG. 4 is an exemplary flow diagram illustrating an SMS OTP request method, according to an embodiment of the invention.

FIG. 4 is an exemplary flow diagram of an authentication method in which mobile communication device 101 is a mobile phone, and authentication requests are made using SMS messages. In block 401, server 151 receives a SMS message from a mobile phone. The SMS message may contain a command requesting authentication, and a string. For example, the SMS message may read "REQUEST REGCODE", in which case "REQUEST" is a command for requesting authentication, and "REGCODE" is a security string. In addition to the request, server 151 will also receive an identifier for the mobile phone, such as the mobile phone number. Server 151 may receive the mobile phone number using Caller ID or other conventional methods. In block 403, server 151 determines if the mobile phone number for the requesting mobile phone is registered in data storage 111. One will appreciate that block 403 represents a first level of authentication, or "first level authentication" performed by server 151. If the mobile phone number is not registered with data storage 111, then in block 405, server 151 may return an error message or may ignore the request. In an embodiment, an administrator may be notified that an unregistered mobile phone number has requested a OTP so that the administrator can take appropriate action, such as locate the user of the unregistered mobile phone to either register the user, or prevent that user from further unauthorized access to server 151.

If server 151 locates the mobile phone number for the requesting mobile phone in data storage 111, then in block 407, server 151 may determine if the string transmitted with the OTP request matches the stored string associated with the registered mobile phone number in data storage 111. For example, does the transmitted "REGCODE" string match the stored string. One will appreciate that block 407 represents a second level of authentication, or "second level authentication" by server 151. If there is no match, then in block 405, server 151 may return an error message, may ignore the request, and/or may notify the administrator of the login error. If there is a match, then in block 409, server 151 will generate a OTP for the mobile phone, which is transmitted to the mobile phone in block 411. One will appreciate that if the user made a typographical error in the SMS OTP request, he may re-send the request and begin again at block 401 of FIG. 4.

One will appreciate that as an added security feature, server 151 may limit the number of times a user can attempt a OTP request. For example, if server 151 receives a SMS OTP request containing an incorrect security string, server 151 may increment a counter that counts the number of times an incorrect OTP request is received from the same mobile communication device. If server 151 receives a certain number of incorrect OTP requests, then server 151 may suspend future OTP requests from that mobile communication device, and the user may have to verbally request removal of the suspension from an administrator. For example, the user may attempt three (3) OTP requests. If the user transmits a fourth ($4^{th}$) incorrect attempt, the user's mobile communication device used to request the OTP may be suspended, and the user may be required to call an administrator to allow the mobile communication device to make future requests. In an embodiment, an administrator may be notified if a user's mobile communication device has been suspended due to excessive incorrect OTP requests.

One will appreciate that as an added security feature, the OTP may have a prescribed time limit, e.g. one (1) minute. This may ensure that only one OTP is generated per request. In an embodiment, server 151 may initiate a countdown timer or other method for calculating how much time has passed as soon as it receives a request for a OTP from a mobile communication device 101, such as in block 401 of FIG. 4. Alternatively, time may be calculated from the instance the generated OTP is transmitted to the mobile phone, (block 411 of FIG. 4). If the mobile communication device 101 sends a second request for a OTP before the time limit is reached, this second request may be ignored. The prescribed time limit may also limit the validity of the generated OTP. For example, if the OTP is not used within the prescribed time limit, then the OTP will expire or be deactivated. In this fashion, unused OTPs can not later be used in order to gain access to secure network servers. The OTP may also expire once it has been used. One will appreciate that these embodiments may require that server 151 receive a notification that a OTP has been used, or that server 151 is able to monitor the use of the generated OTP. Server 151 may utilize an integer counter or other known method in order to monitor use of the generated OTP or calculate the amount of time that has lapsed since receipt of the OTP request.

In an embodiment, each of the stored identifiers for the authorized mobile communication devices 101 may be associated with two integers. The first integer may be used to monitor the validity of a generated OTP, and the second integer may be used to monitor whether the generated OTP has been used to log in to a secure network service. In an embodiment, the integers may be used to count down the time elapsed since server 151 received authentication request or since server 151 has transmitted the generated OTP to the requesting mobile communication device 101. For example, the first integer may decrement by one for every second that has elapsed since transmission of the OTP. If the prescribed time limit is one (1) minute, then the first integer will be set to sixty (60). When the first integer reaches zero (0), then the generated OTP may be deactivated by server 151, thereby preventing future use of the generated OTP. The second integer may be a binary setting for logging usage of a generated OTP. When a OTP is generated and transmitted to the requesting mobile communication device, the second integer may be set at one (1). Once the OTP is used to log into a secure network service, then the second integer may be reset at zero (0). In this fashion, server 151 will have a simple binary way to track or log the usage of a generated OTP. Server 151 can read the value of the second integer to quickly determine whether a generated OTP has been used.

In block 413 of FIG. 4, server 151 determines whether the generated OTP has been used to access a secure network service, which may entail reading a second integer as previously described. If the generated OTP has been used, then in block 415, the OTP will be deactivated. If not, then in block 417, server 151 determines whether the prescribed time limit has been reached. If so, then in block 415, the OTP will be deactivated. If the prescribed time limit has not been reached, then server 151 will return to block 413 to perform another check. One will appreciate that the method illustrated in FIG. 4 and described herein are merely exemplary, and that other steps may be performed without departing from this disclosure or the scope of the invention.

Figure 5A:
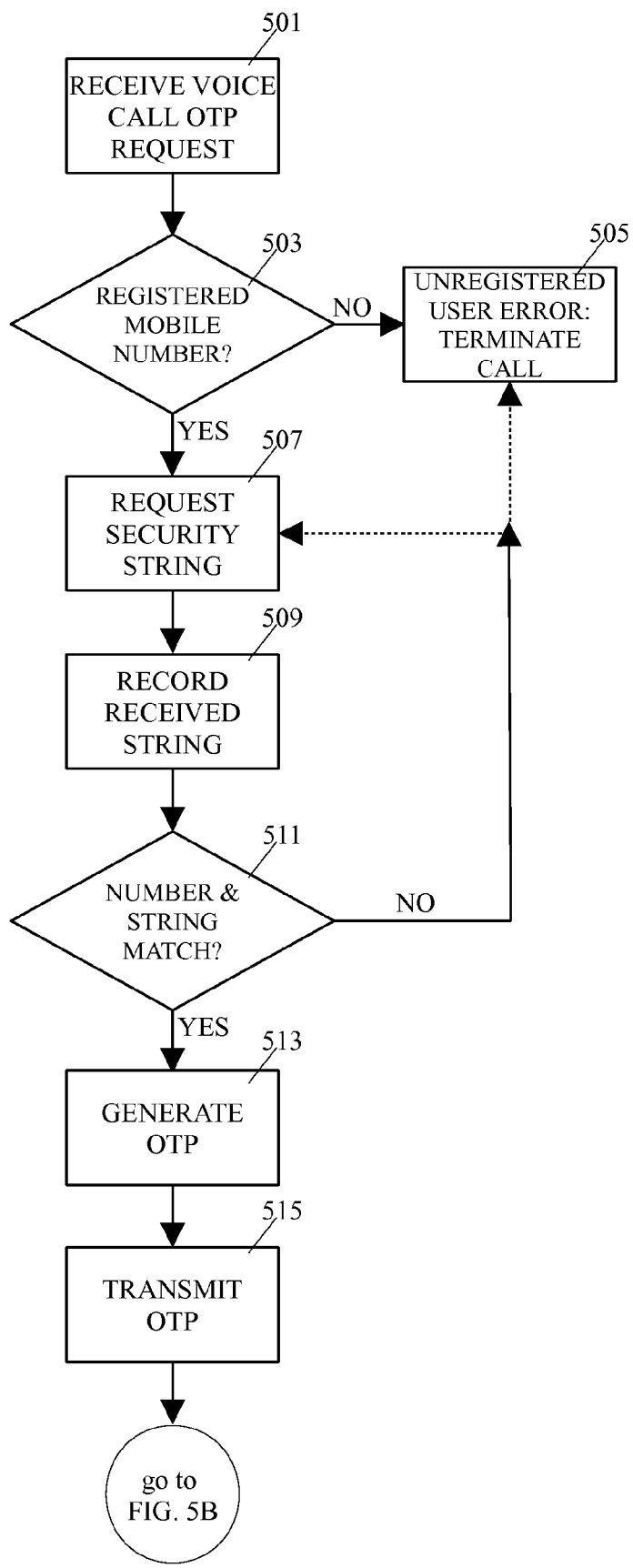
FIG. 5A is an exemplary flow diagram illustrating a voice call OTP request method, according to an embodiment of the invention.
Figure 5B:
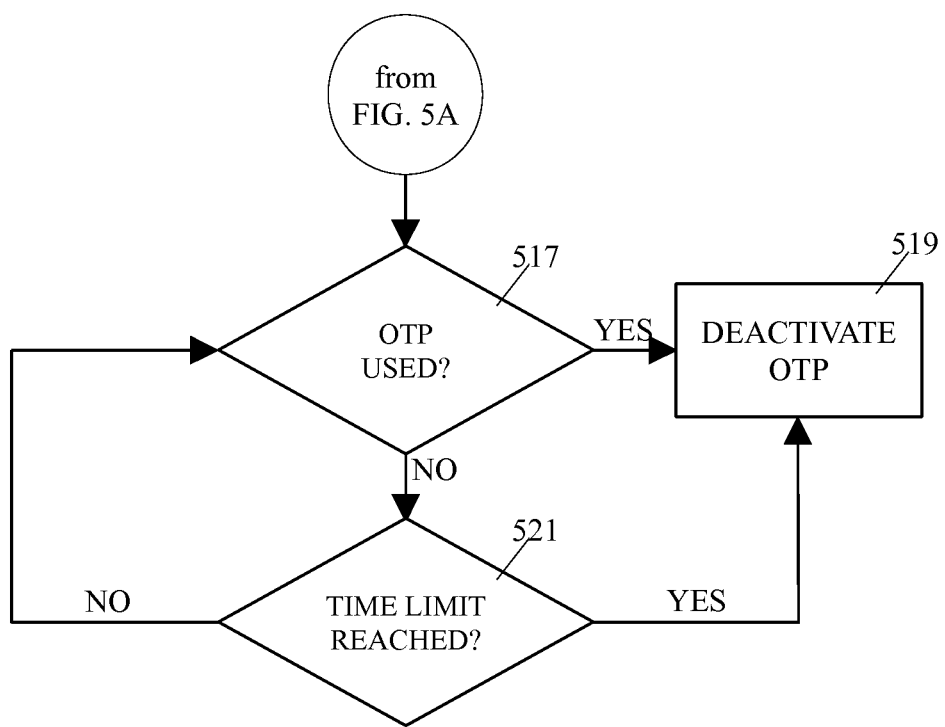
FIG. 5B is an exemplary flow diagram illustrating a voice call OTP request method, according to an embodiment of the invention.

In an embodiment, network 121 may be unable to process SMS messages due to network congestion or other reasons. As such, it may be beneficial if server 151 has the capability of handling voice call requests for OTPs. FIGS. 5A and 5B are exemplary flow diagrams of an authentication method in which mobile communication device 101 is a mobile phone, and authentication is initiated by a voice call from the mobile phone. In this embodiment, the method of FIG. 4 may not be successful, and so the user may opt to perform the method of FIGS. 5A and 5B in order to obtain authentication and receive a OTP. Alternatively, a registered user may opt to perform the method of FIGS. 5A and 5B instead of the method of FIG. 4.

In block 501 of FIG. 5A, server 151 receives a voice call a mobile phone, which will be associated with a mobile phone number. Server 151 may determine the number for the mobile phone number using Caller ID or other conventional methods. In block 503, server 151 determines if the mobile phone number for the calling mobile phone is registered in data storage 111. In this fashion, block 503 represents the first level authentication for the voice call. If the mobile phone number is not registered with data storage 111, then in block 505, server 151 may return an error message or may ignore the request by terminating the call. In an embodiment, an administrator may be notified that an unregistered mobile phone number has called server 151 so that the administrator can take appropriate action, such as locate the user of the unregistered mobile phone to either register the user, or prevent that user from further unauthorized calls to server 151.

If server 151 locates the mobile phone number for the requesting mobile phone in data storage 111, then in block 507 of FIG. 5A, server 151 may verbally request for the user's authentication code, or string, that was stored in data storage 111 during registration. One will appreciate that this process may be completely automated such that the verbal request is made by a synthesized voice rather than a human operator. In block 509, server 151 will record the response from the voice caller. In order to ease processing of the caller's response, the caller will have to enunciate the string character by character. This may involve spelling the string one letter at a time, or if the string contains numbers, providing each number one at a time. For example, if the stored string is "REGCODE", then the caller may be required to spell "R-E-G-C-O-D-E". If the string contains non-Latin characters, such as Chinese, then each character should be pronounced clearly.

In block 511 of FIG. 5A, server 151 will determine if the verbalized string matches the stored string associated with the registered mobile phone number in data storage 111. This may require transcribing the response into machine-readable code that server 151 can use to perform the comparison. One will appreciate that block 511 represents the second level authentication for the voice call. If there is no match, then server 151 may repeat the request in block 507, or server 151 may terminate the call and notify the administrator of the unauthorized call (block 505). If there is a match, then in block 513, server 151 will generate a OTP for the mobile phone, which is transmitted to the mobile phone in block 515. One will appreciate that the OTP may be transmitted as a SMS message to the mobile phone, or as a email to the user's secondary email address during or after the caller has hung up, or may be verbalized to the user during the call.

The additional security measures described in reference to SMS OTP requests may also exist for voice call OTP requests. In block 517 of FIG. 5B, server 151 may determine whether the generated OTP has been used to access a secure network service. If the generated OTP has been used, then in block 519, then the OTP will be deactivated. If not, then in block 521, server 151 determines whether the prescribed time limit has been reached. The time limit may be calculated from the time when server 151 received the voice call from the mobile phone in block 501 of FIG. 5A, or from the time server 151 verbalizes the generated OTP to the user or transmits the OTP to the user by SMS message or email (block 515 of FIG. 5A). If the time limit has been reached, then in block 519, the OTP will be deactivated. If the prescribed time limit has not been reached, then server 151 will return to block 517 to perform another check. One will appreciate that the method illustrated in FIGS. 5A and 5B and described herein are merely exemplary, and that other steps may be performed without departing from this disclosure or the scope of the invention.

As described herein, authentication server 151 may perform two levels of authentication for either a SMS OTP request or voice call OTP request. In this fashion, the invention provides an efficient framework for providing secure OTPs to authorized users using minimal network bandwidth and without requiring an additional hardware token. The OTP may then be used by the authenticated user to log into a secure network service, such as a corporate email server.

One will appreciate that server 151 may have other mechanisms for tracking the receipt of OTP requests, generation of OTPs, and transmission and usage of the generated OTPs. For example, server 151 may log the time it takes to generate, transmit and deactivate an OTP after the OTP is used. If this data reveals that that users are not logging into secure network servers within the prescribed time limit, then the prescribed time limit may require automatic or manual adjustment. Similarly, server 151 could track the number of OTP requests received by a user within the prescribed time limit. If users are making multiple requests for OTPs within the prescribed time limit, then this data may suggest that server 151 is having problems generating and transmitting OTPs in a timely manner. Other information may be generated by the authentication method that may be used to improve the user experience.

One will appreciate that a successful OTP request may involve transmission of the OTP to sites outside of the requesting mobile communication device. For example, a user may be directed to a website to retrieve the generated OTP, or the user may be notified that the OTP is posted on a website whose address only authorized users know. This may add an additional layer of security in the event the mobile communication device is used by a non-authorized user who then uses the device to request a OTP. If the non-authorized user does not know where to retrieve the OTP, then the secure network service will not be compromised. In an embodiment, the OTP may be transmitted to a secondary email address provided by the user upon registration. In this embodiment, the user may request a OTP using the registered mobile communication device, but may navigate to the secondary email address inbox to retrieve the generated OTP.

In the description above and throughout, numerous specific details are set forth in order to provide a thorough understanding of the invention. It will be evident, however, to one of ordinary skill in the art, that the invention may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of the invention. One will appreciate that these steps are merely exemplary and are not meant to be limiting in any way. Other steps and functions may be contemplated without departing from this disclosure or the scope of the invention.

What is claimed is:

1. A method comprising:
   providing, by a server, access to a data storage storing a plurality of authorized mobile phone numbers, each mobile phone number associated with a corresponding user registered security string unique to the mobile phone number, wherein both the mobile phone number and the security string are compared to a previously registered mobile phone number and a previously registered security string to generate a one-time password that is to be transmitted to a requesting mobile phone associated with the mobile phone number, and wherein the security string comprises an answer to a user-selected security question;
   receiving, at the server, a request for a one-time password, the request transmitted from a mobile phone having the mobile phone number, and the request including the security string, the request further being in the form of a short message service message;
   matching, by the server, the mobile phone number from the requesting mobile phone and the security string to the plurality of authorized mobile phone numbers and associated security strings stored in the data storage;
   generating, by the server, the one-time password when there is a match between the mobile phone number and the security string with one of the plurality of authorized mobile phone numbers and associated security strings stored in the data storage;
   transmitting, by the server, the one-time password that can be used without modification to access the data storage by the requesting mobile phone associated with the mobile phone number, and
   deactivating, by the server, the one-time password when the one-time password is not used within a prescribed time period, the prescribed time period being calculated by one of a countdown timer initiated by the server upon receiving a request for the one-time password from the mobile phone and a countdown timer initiated by the server upon transmitting the one-time password to the requesting mobile phone.

2. The method of claim 1, wherein the one-time password transmitted by the server is in the form of a short message service message.

3. The method of claim 1, further comprising:
   deactivating the one-time password as soon as the server receives a notification that the one-time password has been used.

4. The method of claim 3, wherein the prescribed time period is one (1) minute.

5. The method of claim 1, further comprising:
   deactivating the one-time password when the server receives a second request for a one-time password from the mobile phone within a prescribed time period, wherein the prescribed time period beginning when the one-time password request is received at the server.

6. The method of claim 5, wherein the prescribed time period is one (1) minute.

7. A system comprising:
   a processor-based application, which when executed on by a computer processor, will cause the processor to:
      provide, by a server, access to a data storage storing a plurality of authorized mobile phone numbers, each mobile phone number associated with a corresponding user registered security string unique to the mobile phone number, wherein both the mobile phone number and the security string are compared to a previously registered mobile phone number and a previously registered security string to generate a one-time password that is to be transmitted to a requesting mobile phone associated with the mobile phone number, and wherein the security string comprises an answer to a user-selected security question;
      receive, at the server, a request for a one-time password, the request transmitted in the form of a short message service message from a mobile phone having the mobile phone number, and the request including the security string;
      match, by the server, the mobile phone number from the requesting mobile phone and the security string to the plurality of authorized mobile phone numbers and associated security strings stored in the data storage;
      generate, by the server, the one-time password when there is a match between the mobile phone number and the security string with one of the plurality of authorized mobile phone numbers and associated security strings stored in the data storage;
      transmit, by the server, the one-time password that can be used without modification to access the data storage by the requesting mobile phone associated with the mobile phone number, and
      deactivate, by the server, the one-time password when the one-time password is not used within a prescribed time period, the prescribed time period being calculated by one of a countdown timer initiated by the server upon receiving a request for the one-time password from the mobile phone and a countdown timer initiated by the server upon transmitting the one-time password to the requesting mobile phone.

8. The system of claim 7, wherein the server transmits the one-time password during a voice call with the mobile phone in the form of a verbalized one-time password.

9. The system of claim 7, wherein the server transmits the one-time password in the form of a short message service message to the mobile phone.

10. The system of claim 7, wherein the application, when executed by the processor further causes the processor to:
    deactivate the one-time password as soon as the server receives a notification that the one-time password has been used.

11. The system of claim 10, wherein the prescribed time period is one (1) minute.

12. The system of claim 7, further comprising:
    when the server receives a second request for a one-time password from the mobile phone within a prescribed time period, the application, when executed by the processor, further causes the processor to deactivate the one-time password, wherein the prescribed time period beginning when the one-time password request is received at the server.

13. The system of claim 12, wherein the prescribed time period is one (1) minute.

14. A computer program product comprising computer-readable program code to be executed by one or more processors when retrieved from a non-transitory computer-readable medium, the program code including instructions to:

provide, by a server, access to a data storage storing a plurality of authorized mobile phone numbers, each mobile phone number associated with a corresponding user registered security string unique to the mobile phone number, wherein both the mobile phone number and the security string are compared to a previously registered mobile phone number and a previously registered security string to generate a one-time password that is to be transmitted to a requesting mobile phone associated with the mobile phone number, and wherein the security string comprises an answer to a user-selected security question;

receive, at the server, a request for a one-time password, the request transmitted in the form of a short message service message from a mobile phone having the mobile phone number, and the request including the security string;

match, by the server, the mobile phone number from the requesting mobile phone and the security string to the plurality of authorized mobile phone numbers and associated security strings stored in the data storage;

generate, by the server, the one-time password when there is a match between the mobile phone number and the security string with one of the plurality of authorized mobile phone numbers and associated security strings stored in the data storage;

transmit, by the server, the one-time password that can be used without modification to access the data storage by the requesting mobile phone associated with the mobile phone number, and deactivate, by the server, the one-time password when the one-time password is not used within a prescribed time period, the prescribed time period being calculated by one of a countdown timer initiated by the server upon receiving a request for the one-time password from the mobile phone and a countdown timer initiated by the server upon transmitting the one-time password to the requesting mobile phone.

15. The computer program product of claim 14, wherein the server transmits the one-time password in the form of a short message service message to the mobile phone.

16. The computer program product of claim 14, wherein the program code includes further instructions to:

deactivate the one-time password as soon as the server receives a notification that the one-time password has been used.

17. The computer program product of claim 16, wherein the prescribed time period is one (1) minute.

18. The computer program product of claim 14, wherein the program code includes further instructions to deactivate the one-time password when the server receives a second request for a one-time password from the mobile phone within a prescribed time period, wherein the prescribed time period beginning when the one-time password request is received at the server.

19. The computer program product of claim 18, wherein the prescribed time period is one (1) minute.

* * * * *